Feb. 10, 1948.                C. G. MYERS ET AL                2,435,691
                    ISOMERIZATION OF ALICYCLIC HYDROCARBONS
                              Filed Sept. 14, 1945
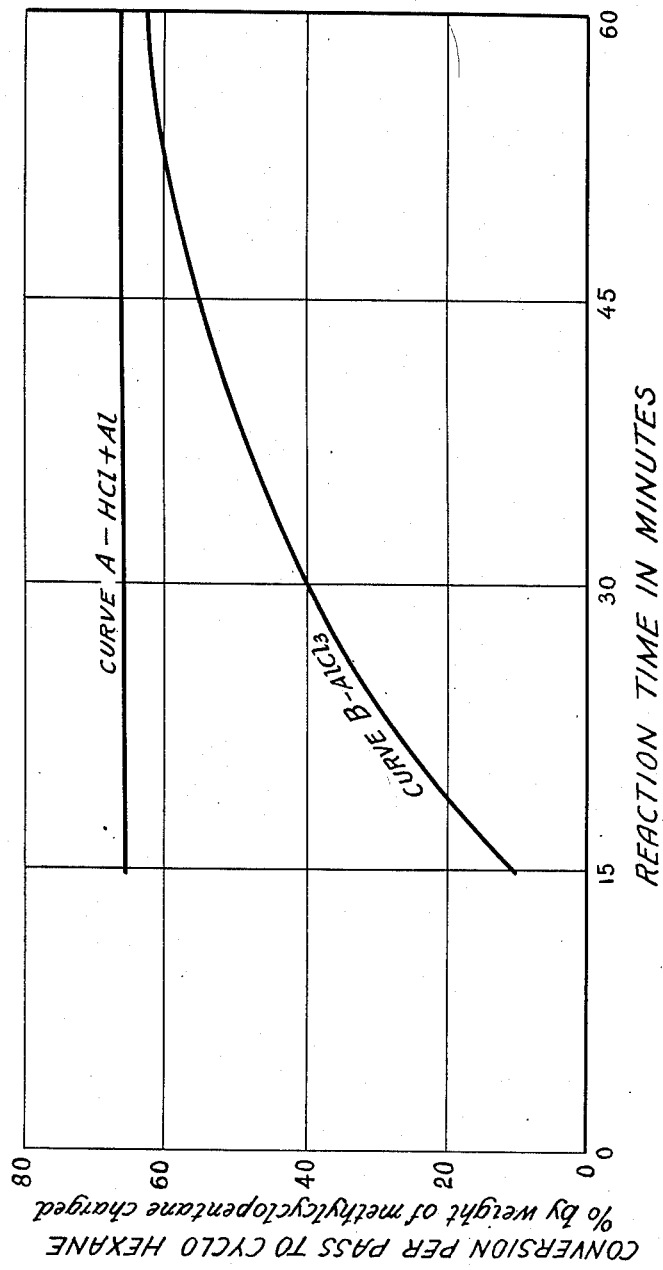
INVENTORS
CLAUDE G. MYERS
and ALEXANDER N. SACHANEN
BY
ATTORNEY Patented Feb. 10, 1948

2,435,691

UNITED STATES PATENT OFFICE 2,435,691

ISOMERIZATION OF ALICYCLIC HYDROCARBONS

Claude G. Myers, Bryn Mawr, Pa., and Alexander N. Sachanen, Woodbury, N. J., assignors to Socony-Vacuum Oil Company, Incorporated, a corporation of New York Application September 14, 1945, Serial No. 616,338

4 Claims. (Cl. 260—666)

This invention relates to the catalytic isomerization of alicyclic hydrocarbons, and is more particularly concerned with an improved process for isomerizing alicyclic hydrocarbons having five to seven carbon atoms in the ring.

As is well known to those familiar with the art, compounds are said to be isomeric when they are composed of the same chemical elements in the same proportion by weight, but have different properties. Such compounds are referred to as isomers, and the reaction conditions of temperature, time, etc., of processes that effect the transformation of one isomer into another, accordingly called isomerization processes, are broadly referred to as isomerizing or isomerization reaction conditions. Structural isomerism is one type of isomerism and connotes that which involves compounds having the same empirical formulas and identical molecular formulas, but which have different structural formulas, and, consequently, different properties. Structural isomerism is referred to as ring-chain isomerism when the isomerism is due to different arrangements of the carbon atoms in the carbon ring. Cyclohexane and methylcyclopentane are typical examples of ring-chain isomerism.

The commercial value of the products obtained in accordance with the present invention is considerable. For example, reasonably large quantities of methylcyclopentane may be obtained from various selected petroleum naphthas. Methylcyclopentane can be isomerized into cyclohexane which, as is well known to those familiar with the art, can be converted to adipic acid by oxidation with nitric acid, and subsequently converted to industrial fiber-like substances, as is well known in the art.

Accordingly, several processes have been proposed for effecting the isomerization of alkylcyclopentanes, cyclohexane, alkylcyclohexanes, cycloheptane, and alkylcycloheptanes. Ordinarily, these processes comprise the use of aluminum chloride as isomerization catalyst. Thus, Nenitzescu and Cantuniari [Egloff, Hulla and Komarewsky—The Isomerization of Pure Hydrocarbons, Chap. IV. Reinhold (1942)] converted 100 parts by weight of methylcyclopentane into 77 parts by weight of cyclohexane by refluxing a mixture of 100 parts by weight of methylcyclopentane, 30.5 parts by weight of aluminum chloride, and 0.8 part by weight of water for 30 hours. Ipatieff and Pines [ibid.] converted 100 parts by weight of ethylcyclopentane into 80 parts by weight of methylcyclohexane by treating 100 parts by weight of ethylcyclopentanes with 18 parts by weight of aluminum chloride and a trace of water, in the liquid phase, at a temperature of 50° C. for 18 hours. Turova-Pollack and his coworkers [ibid.] carried out the following isomerizations: isopropylcyclopentane into dimethylcyclohexanes, normal butylcyclopentane into trimethylcyclohexanes, 1,2-dimethylcyclopentane into methylcyclohexane, and cycloheptane into methylcyclohexane. All of these isomerization reactions were accomplished with conversions of more than 70% by weight and with reaction times of at least 20 hours at the reflux temperatures of the reaction mixtures. Turova-Pollack [ibid.] also found that cyclooctanes are not converted into alkylcyclohexanes, while Rozanov [ibid.] found that methylcyclobutane was not converted into cyclopentane but into pentenes, in the presence of aluminum chloride. Finally, Turova-Pollack [ibid.] found that 1,2-dimethylcyclohexane was easily isomerized into other dimethylcyclohexanes in the presence of activated alumina.

The formation of aluminum halide catalysts in situ is a very recent development in the catalytic isomerization of paraffinic hydrocarbons. In these processes, the catalyst is produced in situ by the reaction of metallic aluminum in the form of chips, foil, flakes, grindings, etc., with a halogen or a compound capable of chemically reacting as the equivalent of a free halogen under the isomerization reaction conditions. Examples of these compounds are hydrogen halides, alkyl halides, organic acid halides, and mixtures thereof. Metallic aluminum in comminuted form may be placed in the reaction zone to form a stationary bed or a series of stationary beds through which the charge stock flows, or small amounts of comminuted metallic aluminum may be added to the charge stock and thereby carried into the reaction zone. If desired, small amounts of substances such as hydrogen chloride, water or oxygen, that expedite the formation of Friedel-Crafts catalysts, as well as small amounts of water, may be advantageously used, as is well known in the art. The halogen or halogen-containing compound may be introduced directly into the reaction zone in the case where the comminuted metallic aluminum is placed therein prior to the isomerization operation, or the halogen or halogen-containing compound may be added to the charge stock in the case where the comminuted metallic aluminum is added to the charge stock.

A copending application, Serial Number 554,184, filed September 15, 1944, in which the present inventors are coinventors, is directed to the process for effecting the isomerization of paraffinic hydrocarbons having five to seven carbon atoms inclusive, which comprises contacting said hydrocarbons in a reaction zone under said isomerization reaction conditions, with a nascent aluminum halide isomerization catalyst formed in said reaction zone under said isomerization reaction conditions, in the presence of certain types of organic aromatic compounds. In this copending application, it was pointed out that under comparable reaction conditions, in the absence of a cracking inhibitor, there was substantially no difference between operations wherein aluminum halide isomerization catalysts in statu nascendi were used, and operations wherein preformed aluminum halide isomerization catalysts were employed, in so far as the yields of isomers, reaction conditions and the amounts of undesirable products produced were concerned. Accordingly, it was concluded that the use of aluminum halide isomerization catalysts in statu nascendi could be considered a convenient method of introducing the catalyst in the reaction zone. No essential advantage could be claimed for it over the use of preformed aluminum halide isomerization catalysts, with respect to the results obtained.

We have now discovered that in the isomerization of alicyclic hydrocarbons having five to seven carbon atoms in the ring, the use of aluminum halide isomerization catalysts formed in situ produces higher conversions per pass than preformed aluminum halide isomerization catalysts, when comparatively mild reaction conditions are employed.

We have found that in the isomerization of alicyclic hydrocarbons having five to seven carbon atoms inclusive in the ring, in the presence of aluminum halide isomerization catalysts formed in situ, it is possible to achieve yields per pass of isomers much higher than those obtained with preformed aluminum halide isomerization catalysts, using lower catalyst concentrations of catalyst under otherwise comparable reaction conditions.

Accordingly, it is an object of the present invention to provide an efficient process for effecting the isomerization of alicyclic hydrocarbons. Another object is to provide an efficient process for isomerizing alicyclic hydrocarbons having five to seven carbon atoms inclusive, in the ring. A further object is to afford an improved process for isomerizing alicyclic hydrocarbons having five to seven carbon atoms inclusive, in the ring, in the presence of aluminum halide isomerization catalysts. A more specific object is to provide a process for isomerizing alicyclic hydrocarbons having five to seven carbon atoms inclusive, in the ring, in the presence of nascent aluminum halide isomerization catalysts formed in situ.

Other objects and advantages of the present invention will become apparent to those skilled in the art from the following description taken in conjunction with the following drawing which shows a series of curves representing graphically the relationship between the conversion per pass of methylcyclopentane into cyclohexane, in the presence of aluminum chloride in statu nascendi and of preformed aluminum chloride, and the time of reaction.

Broadly stated, the present invention provides a process for effecting the isomerization of alicyclic hydrocarbons having five to seven carbon atoms inclusive, in the ring, which comprises contacting said hydrocarbons in a reaction zone under isomerization reaction conditions, with a nascent aluminum halide isomerization catalyst formed in said reaction zone under said isomerization reaction conditions.

It must be clearly understood that when we speak of an aluminum halide isomerization catalyst, we have reference to aluminum chloride, aluminum bromide and aluminum iodide. It is generally recognized that aluminum fluoride has no isomerization catalytic activity. On the other hand, mixed salts of aluminum, such as $AlCl_2F$, do promote isomerization and accordingly are to be considered as coming within the scope of the present invention.

A feature of our invention is that the aluminum halide isomerization catalysts are utilized in their highest state of catalytic activity, i. e., in the nascent state, while avoiding the disadvantages inherent in the use of anhydrous aluminum halides, such as special equipment to handle and ensure maintaining the aluminum halides in a substantially anhydrous state.

An important feature of our invention is that in the isomerization of alicyclic hydrocarbons, yields higher than those obtained in the prior art are obtained using lower concentrations of catalyst.

Another important feature is that in the isomerization of alicyclic hydrocarbons, yields higher than those of the prior art are obtained using relatively mild isomerization reaction conditions.

Generally speaking, in a given isomerization operation employing metallic aluminum and hydrogen chloride, for example, the amount of nascent aluminum chloride formed in situ is a function of the time. Therefore, by employing adequate amounts of metallic aluminum and hydrogen chloride, it is possible, by varying the reaction time, to vary the concentration of the nascent aluminum chloride.

Referring now more particularly to the curves shown in the drawing which are based on data obtained by treating methylcyclopentane at a temperature of about 102° C. for varying periods of time, using charge stocks containing in addition to 96 parts by weight of methylcyclopentane and 4 parts by weight of normal hexane, 10 parts by weight of metallic aluminum and 10.7 parts by weight of hydrogen chloride, in the case of curve A, and amounts of aluminum chloride and hydrogen chloride, substantially equal to those formed and present in the corresponding runs where metallic aluminum and hydrogen chloride were employed in the case of curve B; it will be observed that under substantially identical isomerizing conditions, the combination of metallic aluminum and hydrogen chloride is far more effective, particularly when the reaction time is relatively small, than the combination of aluminum chloride and hydrogen chloride, even though an amount of preformed aluminum chloride equal to that formed in situ in the first instance, and an amount of hydrogen chloride substantially equal to that remaining after formation of the aluminum chloride in situ, and present as promoter in the first instance, were used.

It follows, therefore, that at low catalyst concentrations higher conversions per pass are achieved using nascent aluminum halide isomerization catalysts produced in situ than are produced with preformed aluminum halide isomerization catalysts, other variables remaining constant. It also follows that in achieving a desired degree of isomerization, our invention permits the use of reaction conditions (reaction time) which are milder than those permissible with preformed aluminum halide isomerization catalysts, other variables remaining constant. Therefore, in any given isomerization reaction, the optimum yield of desired isomer can be achieved, in accordance with our invention, in a period of reaction time which is appreciably less than that required when using the conventional preformed aluminum halide isomerization catalyst. Thus, again referring more particularly to the curves shown in the drawing, it will be noted that although at the end of 60 minutes of reaction time the conversions achieved using the combination of metallic aluminum and hydrogen chloride (curve A) and the combination of aluminum chloride and hydrogen chloride (curve B), respectively, are substantially the same, the combination of metallic aluminum and hydrogen chloride will achieve substantially the same conversion using a reaction time of 15 minutes. Hence, it may be concluded that the use of the combination of metallic aluminum and hydrogen chloride will achieve optimum yields of desired isomer using a period of time equal to about one-quarter that required when a preformed aluminum halide isomerization catalyst is employed.

We have not been able to find any evidence that in the process of the present invention, other metals, such as iron or zinc, can be used instead of aluminum. Since the isomerization catalytic activity of the halides of such metals is considerably less than that of aluminum halides, it is probable that in our type of operation the halides of these metals are formed in amounts insufficient to promote reaction.

In general, the present process is capable of converting alicyclic hydrocarbons having five to seven carbon atoms inclusive, in the ring. We have found that cyclopentane cannot be isomerized in our process as could be expected from the theoretical standpoint. Therefore, alkylcyclopentanes, cyclohexane, alkylcyclohexanes, cycloheptane and alkylcycloheptanes are the alicyclic hydrocarbons included within the scope of the present invention. Dimethylcyclopentane, ethylcyclohexane, propylcyclohexane and butylcycloheptane may be mentioned by way of non-limiting specific examples. It must be understood that the charge stocks may comprise petroleum naphthas having a low olefinic hydrocarbon content. The isomerization reaction does not appear to be inhibited by the presence of aromatic, paraffinic or other alicyclic hydrocarbons. Large amounts of olefinic hydrocarbons deactivate aluminum halide isomerization catalysts and therefore increase considerably catalyst consumption. Generally speaking, any hydrocarbon mixture in which olefinic hydrocarbons are present in small amounts, such as a straight-run naphtha, is a suitable charge stock for the process of our invention.

As is well known in the art, isomerization is a reaction which reaches an equilibrium. Thus, for example, methylcyclopentane is converted to a mixture of methylcyclopentane and cyclohexane. Similarly, cyclohexane is converted to a mixture of cyclohexane and methylcyclopentane. The extent that the isomerization reaction will proceed in any given direction is determined by the equilibrium constant for the reaction. Accordingly, it must be clearly understood that for any given system, our process is applicable to the isomerization in either direction.

The isomerizing conditions of the process of the present invention include wide ranges of temperatures, time of contact, catalyst concentration, pressures, etc., as is well known in the art. It must be clearly understood, however, that all these factors are more or less inter-related, and that under a given set of conditions, the ease of formation of aluminum halide from metallic aluminum and the halogen-containing substance, will govern to a considerable extent, the temperature and time of reaction. Ordinarily, temperatures varying between about 75° C. and about 200° C., preferably, temperatures varying between about 90° C. and about 150° C., and a contact time varying between about several seconds and about one hour, depending upon the temperature, the pressure, and the amounts of hydrogen halide and aluminum, produce good results.

The isomerization reaction may be carried out in the liquid phase, in the gaseous phase, or in the mixed phase, depending upon the particular conditions used. We prefer to use a liquid phase operation, the pressure employed being sufficient to maintain the hydrocarbon reactant in the liquid phase at a temperature within the range indicated hereinbefore.

The process may be carried out as a batch, continuous or semi-continuous type of operation. Particularly when the process is conducted on a commercial scale, economic considerations make it advantageous to operate in a continuous manner. For efficient operation, whether the process is carried out on a batch or continuous basis, it is essential that the reactants be intimately contacted with one another. This may be achieved in several ways and in apparatuses that are well known in the art.

In accordance with our invention, we obtain a product containing substantial amounts of desired isomers which may be separated from the effluent and fractionated to recover the desired isomer or isomers. The unconverted constituents may then be recycled with fresh charge stock, to the isomerization reaction zone for further treatment. Ultimate yields of desired isomers may be as high as 95% by weight of hydrocarbon charge. Small amounts of aluminum halide "sludge," of the order of 1–5% by weight of hydrocarbon charge, are formed in the process. This sludge represents the main source of process loss. If relatively high proportions of hydrogen halide are used and the sludge is formed in a comparatively large amount, the sludge may be still active. In continuous operation, these active sludges may be recycled to the reactors for better utilization of the catalyst.

The following detailed examples are for the purpose of illustrating modes of carrying out the process of our invention, it being clearly understood that the invention is not to be considered as limited to the specific reactants and conditions set forth in the examples. As it will be apparent to those skilled in the art, a wide variety of other alicyclic hydrocarbons within the scope of our invention may be used.

*Example 1*

A mixture containing 96 parts by weight of methylcyclopentane, 4 parts by weight of normal hexane, and 10 parts by weight of aluminum turnings was charged into a 500 cc. low-carbon steel stirring autoclave. 10.7 parts by weight of dry, gaseous hydrogen chloride were added and then the autoclave was heated in a glycerine bath to a temperature of about 102° C. and maintained at about this temperature for about two hours. The autoclave was then cooled for about 15 minutes in an ice-water bath and any residual gas was released slowly through a soda-lime trap which scrubbed out any remaining hydrogen chloride. The synthetic crude remaining in the autoclave was water-washed, and then alkali-washed until all acid had been removed from the hydrocarbon mixture. Finally, the synthetic crude was dried over calcium chloride and analyzed by Podbielniak distillation and infra-red spectroscopy with the following results:

| | Per cent by weight |
|---|---|
| Cyclohexane | 70±5 |
| Methylcyclopentane | 25±5 |
| Paraffinic hexanes | 5±2 |

*Example 2*

The run described in Example 1 was repeated but in this case, the time of reaction was one hour. The synthetic crude analyzed as follows:

| | Per cent by weight |
|---|---|
| Cyclohexane | 67 ±5 |
| Methylcyclopentane | 30 ±5 |
| Paraffinic hexanes | 3 ±2 |
| Butanes and pentanes | 0.9±1 |

*Example 3*

The run described in Example 1 was repeated but in this case, the time of reaction was 30 minutes. The synthetic crude analyzed as follows:

| | Per cent by weight |
|---|---|
| Cyclohexane | 67±5 |
| Methylcyclopentane | 32±5 |
| Paraffinic hexanes | 1±1 |

*Example 4*

The run described in Example 1 was repeated but in this case, the reaction time was 15 minutes. The synthetic crude analyzed as follows:

| | Per cent by weight |
|---|---|
| Cyclohexane | 65±5 |
| Methylcyclopentane | 35±5 |

Although the present invention has been described in conjunction with preferred embodiments, it is to be understood that modifications and variations may be resorted to without departing from the spirit and scope of the invention, as those skilled in the art will readily understand. Such variations and modifications are considered to be within the purview and scope of the appended claims.

We claim:

1. In the process for effecting the isomerization of an alicyclic hydrocarbon selected from the group consisting of alkylcyclopentanes, cyclohexane, alkylcyclohexanes, cycloheptane and alkylcycloheptanes, which comprises contacting said alicyclic hydrocarbon with an aluminum halide isomerization catalyst in a reaction zone under isomerization reaction conditions, and for a period of time sufficient to achieve optimum yields of desired isomer; the improvement which includes contacting said alicyclic hydrocarbon with a nascent aluminum halide isomerization catalyst formed in said reaction zone under said isomerization reaction conditions, for a period of time equal to about one-quarter that required when a preformed aluminum halide isomerization catalyst is employed.

2. In the process for effecting the isomerization of an alicyclic hydrocarbon selected from the group consisting of alkylcyclopentanes, cyclohexane, alkylcyclohexanes, cycloheptane and alkylcycloheptanes, which comprises contacting said alicyclic hydrocarbon with an aluminum chloride isomerization catalyst in a reaction zone under isomerization reaction conditions, and for a period of time sufficient to achieve optimum yields of desired isomer; the improvement which includes contacting said alicyclic hydrocarbon with a nascent aluminum chloride isomerization catalyst formed in said reaction zone under said isomerization reaction conditions, for a period of time equal to about one-quarter that required when a preformed aluminum chloride isomerization catalyst is employed.

3. In the process for effecting the isomerization of methylcyclopentane, which comprises contacting said methylcyclopentane with an aluminum halide isomerization catalyst in a reaction zone under isomerization reaction conditions, and for a period of time sufficient to achieve optimum yields of desired isomer; the improvement which includes contacting said methylcyclopentane with a nascent aluminum halide isomerization catalyst formed in said reaction zone under said isomerization reaction conditions, for a period of time equal to about one-quarter that required when a preformed aluminum halide isomerization catalyst is employed.

4. In the process for effecting the isomerization of methylcyclopentane which comprises contacting said methylcyclopentane with an aluminum chloride isomerization catalyst in a reaction zone under isomerization reaction conditions, and for a period of time sufficient to achieve optimum yields of desired isomer; the improvement which includes contacting said methylcyclopentane with a nascent aluminum chloride isomerization catalyst formed in said reaction zone under said isomerization reaction conditions, for a period of time equal to about one-quarter that required when a preformed aluminum chloride isomerization catalyst is employed.

CLAUDE G. MYERS.
ALEXANDER N. SACHANEN.

REFERENCES CITED

The following references are of record in the file of this patent:

UNITED STATES PATENTS

| Number | Name | Date |
|---|---|---|
| 2,288,866 | Hoog | July 7, 1942 |
| 2,265,870 | Schuit | Dec. 9, 1941 |
| 2,271,043 | Van Peski | Jan. 27, 1942 |
| 2,344,466 | Laughlin | Mar. 14, 1944 |